United States Patent
Schuman et al.

(10) Patent No.: US 6,182,145 B1
(45) Date of Patent: Jan. 30, 2001

(54) METHOD AND APPARATUS FOR PARALLEL PORT INTERCONNECTION

(76) Inventors: Donald K. Schuman, 10603 170th Ct. Northeast; Jay Lowe, 13932 NE. 60th #147, both of Redmond, WA (US) 98052

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/787,431

(22) Filed: Jan. 22, 1997

Related U.S. Application Data

(63) Continuation of application No. 08/339,330, filed on Nov. 14, 1994, now abandoned.

(51) Int. Cl.⁷ ............................. G06F 15/16; G06F 13/00
(52) U.S. Cl. ........................ 709/237; 710/129; 710/20; 395/500.46
(58) Field of Search ........................... 395/310, 500, 395/309, 200.3, 200.48, 200.57, 200.6, 200.62, 200.67, 500.46, 500.18; 370/395; 364/240.8, 222.2; 710/129, 20; 709/237

(56) References Cited

U.S. PATENT DOCUMENTS

| | | | |
|---|---|---|---|
| 4,509,113 | * | 4/1985 | Heath ........................... 710/66 |
| 5,111,423 | * | 5/1992 | Kopec, Jr. et al. ........... 395/500 |
| 5,293,497 | * | 3/1994 | Free ............................. 395/310 |
| 5,414,707 | * | 5/1995 | Johnston et al. ............. 370/395 |

* cited by examiner

*Primary Examiner*—John Breene
*Assistant Examiner*—Greta L. Robinson
(74) *Attorney, Agent, or Firm*—Robert M. Storwick

(57) ABSTRACT

A method and apparatus for parallel communication from a PC to an external device. The apparatus is connected between the PC and the external device. The apparatus is encoded so that its identity can be read by the PC and the external device. The PC then communicates with the external device through the apparatus, informing the external device of the communication mode that the PC uses to communicate. In response, the external device communicates through the apparatus to inform the PC of the communication mode that it uses. Subsequently, the PC transmits information to the apparatus for retransmission to the external device. As a result of the data it has previously obtained from the PC and the external device, the apparatus configures itself so that it can optimize the transmission of information from the PC to the external device. The method is the method of receipt and processing of the data used to optimally configure the apparatus of the invention.

3 Claims, 4 Drawing Sheets

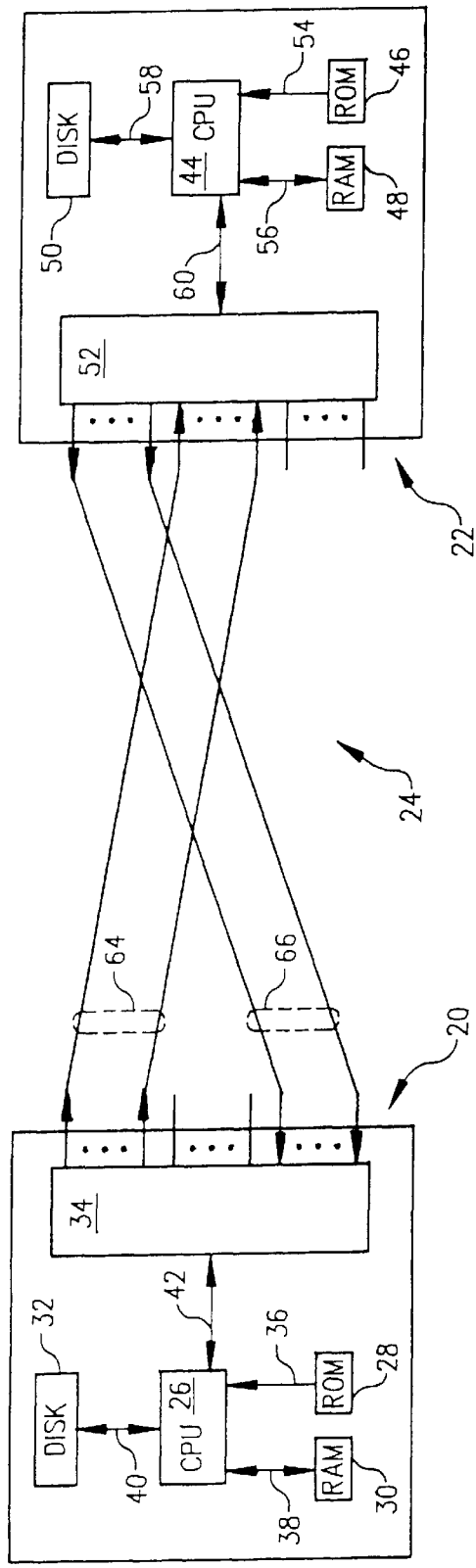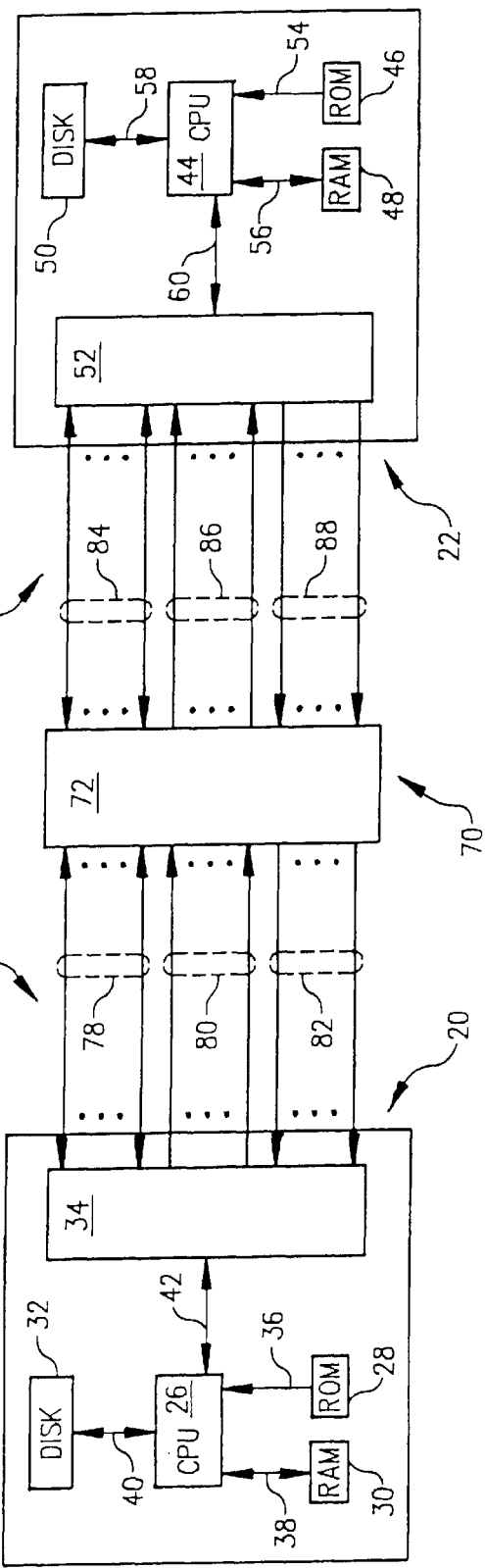
FIG. 1 (PRIOR ART)
FIG. 2

METHOD AND APPARATUS FOR PARALLEL PORT INTERCONNECTION

This is a continuation of the prior application Ser. No. 08/339,330, filed Nov. 14, 1994, now abandoned the benefit of the filing dates of which are hereby claimed under 35 USC 120.

TECHNICAL FIELD

The present invention relates to communication between electronic devices, and more particularly, to methods and apparatus for communication between two electronic devices, each according to its corresponding protocol.

BACKGROUND OF THE INVENTION

It is common for one electronic device (say, a personal computer—PC) to communicate information to an external electronic device (say, a printer) over an interconnection. Typically this interconnection is a wire cable configured for the specific purpose. One popular standard for communication between a PC and a printer is the Centronics standard. According to this standard, the information is transmitted in parallel form, so that all of the bits that make up each computer word of information are transmitted simultaneously to the external device over separate lines in the wire cable.

There are many protocols for communication between two electronic devices according to the scenario described above. Generally there is a "handshake" phase in which each of the two electronic devices confirms the presence of, and correct interconnection with, the other device. Next the device that is the source of the information prepares the first word of information to be transmitted. After the word is prepared and loaded into a data latch, the information source sends a signal to the information recipient to notify the recipient. The information recipient configures itself for receipt of the information and sends an acknowledgement signal back to the signal source. Thereafter, the first word of information is transmitted. Upon correct receipt of the word of information, the recipient sends a signal to the information source, verifying that the word was received. This process is then repeated until all of the intended information has been transmitted.

As technology has progressed, a number of different protocols have developed and so has the need for higher speed transfer of information between two electronic devices. As a result, certain standards for such protocols have been developed. As one example, they are described in "Standard Signaling Method for a Bidirectional Parallel Peripheral Interface for Personal Computers," IEEE P1284 D1.00, published in draft form on Mar. 15, 1993. This document is hereby incorporated by reference. In accordance with such standards, it is important to be able to interconnect two electronic devices regardless of their own individual protocols. Further, once the two electronic devices are interconnected, it is important that the transfer of information be as fast as possible.

Heretofore, increased information transmission speeds have been realized by using wires in the interconnecting cable for purposes other than those for which they were originally intended. For example, wires that were originally intended for the bidirectional transfer of notification and acknowledgement signals are also used to transfer additional bits of the information, thereby increasing the cable's transmission speed capability. However, this approach typically requires changes in the software (and, possibly, the hardware) of the information source and recipient devices. If the source and recipient devices are then later used in other configurations, it may be necessary to change the software or hardware again for this new use. Accordingly, it is desirable to have an apparatus and method for providing a communications capability between two electronic devices without requiring that the two devices be reprogrammed.

SUMMARY OF THE INVENTION

According to one aspect, the invention is an apparatus for transferring information from a first electronic device to a second electronic device, wherein the first electronic device communicates through a first I/O port according to a first protocol and the second electronic device communicates through a second I/O port according to a second protocol. The apparatus comprises a circuit connected between the first and second I/O ports. The circuit is adapted to receive signals from the first and second electronic devices through the first and second I/O ports, respectively. The circuit is also configurable in response to the signals so that the circuit receives the information according to the first protocol through the first I/O port and transmit the information to the second electronic device through the second I/O port according to the second protocol.

In a further aspect, the invention is a method for transferring data information from a first electronic device to a second electronic device. In this method, the first electronic device communicates through a first I/O port according to a first protocol and the second electronic device communicates through a second I/O port according to a second protocol. The first and second I/O ports are connected by a transmission means structured to transmit data information according to a default base protocol mode. The default base protocol mode is the lowest level protocol mode in a plurality of protocol modes having various performance levels.

The method includes the steps of a) the first electronic device transmitting information to the second electronic device in accordance with the default base protocol mode of the transmission means and b) the first electronic device transmitting information to the second electronic device in accordance with the next higher level protocol mode. Also, the method includes the step of c) the first electronic device then transferring the data information to the second electronic device in accordance with the highest level protocol mode of the transmission means for which it received the transmitted information from the second electronic device.

In a still further aspect, the invention is a method for transferring data information from a first electronic device to a second electronic device, where the first electronic device communicates through a first I/O port according to a first protocol and the second electronic device communicates through a second I/O port according to a second protocol. The method includes the steps of a) determining the first protocol of communication by receiving protocol information from the first circuit and b) determining the second protocol of communication by receiving protocol information from the second circuit. The method further includes the step of c) programming a circuit connected between the first and second I/O ports to configure itself in response to the determined protocols so that the circuit can receive the data information according to the first protocol through the first I/O port and transmit the data information to the second electronic device through the second I/O port according to the second protocol to achieve a predetermined throughput rate of information between the first electronic device and the second electronic device.

BRIEF DESCRIPTION OF THE DRAWINGS

FIG. 1 is a schematic diagram of a parallel interconnect scheme known in the prior art.

FIG. 2 is a schematic diagram of an exemplary parallel interconnect scheme in accordance with the preferred embodiment of the invention.

DETAILED DESCRIPTION OF THE PREFERRED EMBODIMENT OF THE INVENTION

Figure 3:
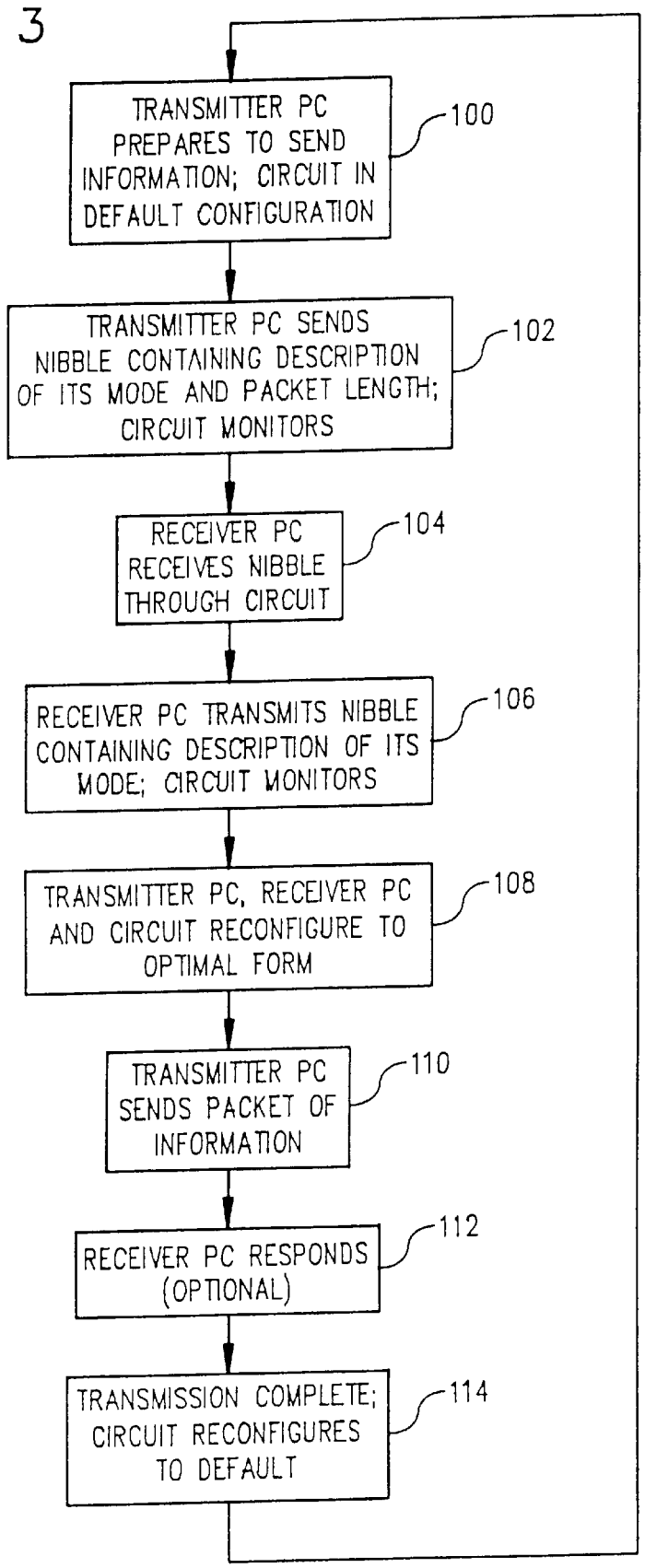
FIG. 3 is a flow chart of the inventive method of configuring electronic devices for communication of information from one to the other.

FIG. 1 is a schematic diagram of a parallel interconnect scheme known in the prior art. In accordance with FIG. 1, a first electronic device 20 (say, a first PC) communicates with a second electronic device 22 (say, a second PC) through a communication channel 24. While it is known that the prior art includes communication between PCs, it is also known that the prior art includes communication between a PC and another device, such as a printer.

The first electronic device 20 includes a programmable central processing unit (CPU) 26, a read-only memory (ROM) 28, a random access memory (RAM) 30, a disk drive 32, and an input/output (I/O) port 34. The CPU 26 operates in accordance with an operating system typically loaded into the CPU 26 from the ROM 28 through the unidirectional line 36 at start-up. The ROM 28 can also serve as a source for additional program instructions which are used to operate the CPU 26. The CPU 26 stores instructions, data and intermediate computational results in the RAM 30. The CPU 26 subsequently operates in accordance with the instructions and retrieves the data and intermediate computational results for output or further computations through the bidirectional line 38. Another source and storage place for programming instructions, data and intermediate computational results is the disk drive 32 which is connected to the CPU 26 through the bidirectional line 40. The disk drive 32 can be either a hard drive or a floppy disk drive which receives removable diskettes. The CPU 26 also communicates data with the I/O port 34 through a bidirectional line 42.

The second electronic device 22 includes a programmable CPU 44, a ROM 46, a RAM 48, a disk drive 50, and an I/O port 52. The components included in the second electronic device 22 also operate and are interconnected similarly to the components in the first electronic device 22. Specifically, the CPU 44 is connected with the ROM 46 through the unidirectional line 54 and the CPU 44 communicates instructions, data and intermediate computational results with the RAM 48 through the bidirectional line 56. Also, the disk drive 50 is connected to the CPU 44 through the bidirectional line 58 and the CPU 44 communicates data with the I/O port 52 through a bidirectional line 60.

The communication channel 24 includes unidirectional lines 64 and unidirectional lines 66. The unidirectional lines 64 can only be used to transfer information, four bits at a time, from the I/O port 34 of the first device 20 to the I/O port 52 of the second device. The unidirectional lines 66 can only be used to transfer information, four bits at a time, from the I/O port 52 of the second device 22 to the I/O port 34 of the first device.

For devices such as those illustrated in FIG. 1, whose parallel ports do not have an 8-bit bidirectional capability (typically laptop computers), 4-bit data transfers are accomplished when reading data from the device. This is accomplished by having the device present the data four bits at a time on four of the five STATUS signal lines. The speed of such 4-bit data transfers is affected by the choice of the four lines from the five available (specifically, BUSY, ACK, SELECT, PAPER, and ERROR).

In the other embodiments of the prior art known to those skilled in the art, if the first and second devices 20 and 22 are IBM PCs (or IBM-compatibles), for example, the communication channel 24 can be a Centronic compatible data link. This data link was originally used to connect early IBM PCs with Centronic printers, but subsequently became an important standard for most types of communications between an IBM PC and other external devices, such as software security keys, parallel port network adapters, parallel port hard disk products, and others.

This version of the communication channel 24 takes the form of a wire cable having 17 signal lines and 8 ground lines. The cable uses a DB25 style connector at each end, and the I/O ports 34 and 52 are equipped with mating connectors so that the communication channel 24 can be established therebetween. There are eight lines in the cable included in the channel that are used to transmit data signals (denoted DATA 1 through DATA 8). There are five lines in the cable that are used to transmit status signals (denoted BUSY, ACK, SELECT, PAPER, and ERROR). Also, there are four lines in the cable that are used to transmit control signals (denoted STROBE, AF, INIT, and SEL). Finally, the remaining eight lines in the cable are used as ground lines.

Although most of the IBM PC compatible parallel (i.e., I/O) ports are designed to be output only ports, they can be used for bidirectional data transfers by following a set of design guidelines.

Although all IBM PC compatible parallel ports have the capability of outputting data to an external device or printer eight bits at a time, only certain types of parallel ports can also input data from an external device eight bits at a time. These certain types of parallel ports are termed 8-bit bidirectional. Such 8-bit bidirectional lines constitute eight lines connecting the DATA signal pins of the I/O ports 34 and 52. Also, unidirectional lines are used to transfer signals from the CONTROL signal pins of the I/O port 34 to the STATUS signal pins of the I/O port 52. Further, unidirectional lines are used to transfer signals from the CONTROL signal pins of the I/O port 52 to the STATUS signal pins of the I/O port 34.

Currently, in almost all cases, the speed at which data can be transferred to or from an external device is affected by several things. These include 1) the processor speed of the computer, 2) the actual signal lines used to transfer data to and from the device, 3) the signal lines used to control the transfer of data to and from the external device, 4) the length of the cable connecting the external device to the parallel port, and 5) the software instructions used in the computer to access the data through the parallel port.

As described previously, at first the two devices that are going to communicate exchange handshakes. Generally, the source device, with the data to transfer, initiates the handshake by sending signals to the intended recipient and then waiting for the recipient to send back signals to the source.

The techniques used by most existing products to control the transfer of data from an external device include having the driver software in the computer set a CONTROL signal to which the external device responds. (If doing 8-bit bidirectional accesses, the response is to place data on the DATA signal lines. However, in the case of 4-bit transfers, four bits of the data are placed on four of the STATUS signal lines.) The driver software then reads the data from the appropriate place in the I/O port, stores the data, and then sets the CONTROL signal in the opposite state to indicate to the external device to send the next data.

To be more specific, 4-bit data read transfers are accomplished by having the device send data four bits at a time via the STATUS port signal lines. A nibble selector (one of the CONTROL or DATA signal lines) is used to select which nibble (i.e., least significant nibble (LSN) or most significant nibble (MSN)) is to be presented to the STATUS port by the external device. Generally, this operation assumes that the external device is designed to be capable of returning the data immediately after changing the state of the nibble selector signal. This is accomplished by the control logic in the external device (for example, in the CPU of the external device).

In the more common 8-bit mode accesses, the external device is designed to be capable of returning the data immediately after a complete toggle of a byte access control signal. This is accomplished by control logic in the external device (for example, in the CPU of the external device). To support 8-bit mode accesses, the device is designed to return a single byte to the DATA port signal lines after each toggle of the byte access control signal. The byte access control signal is typically controlled directly by one of the CONTROL port signals (STROBE, INIT, AF or SEL).

Aside from the 4-bit and "normal" 8-bit modes described above, it is also possible to have an 8-bit turbo mode to read data from external devices. In this mode, the external device design is capable of returning the data after changing the state of the byte access and selector control signal (which is one of the CONTROL signal lines, for example, the SEL line). This, too, is accomplished by control logic in the external device (for example, in the CPU of the external device).

In the normal 8-bit mode, the CONTROL signal line which tells the external device to access the next byte is toggled to a low level and then back to a high level for each byte of data. However, in the 8-bit turbo mode, the CONTROL signal line is set to the opposite state for each byte of data (or nibble of data, in the case of 4-bit mode). This increases the data throughput capability of the external device, since there are two fewer I/O instructions required in the turbo mode than in the normal mode for each byte of data accessed. Also, typically the intended data recipient is not an "always-ready" device, so that it needs a STATUS signal. In addition, most current devices also use a STATUS signal to increase their communication speed. To operate 8-bit turbo mode accesses, the device is designed to return a byte to the DATA port signal lines after the byte access and selector control signal toggles in each direction. Similarly to the 8-bit mode, the byte access and selector control signal is typically controlled directly by one of the CONTROL port signals (STROBE, INIT, AF, or SEL).

FIG. 2 is a schematic diagram of an exemplary parallel interconnect scheme in accordance with the preferred embodiment of the invention. In accordance with FIG. 2, and similarly to FIG. 1, a first electronic device 20 has information which it is to communicate to a second electronic device 22. The descriptions of first and second electronic devices 20 and 22 are identical to those provided in the description of FIG. 1. The information is to communicated through a communication channel 70. The communication channel 70 includes a circuit 72 and two subchannels 74 and 76. The combination of the circuit 72 and the two subchannels 74 and 76 are more fully described in the Universal Cable Module (UCM) Specification, version 0.91, dated Apr. 27, 1994, which was confidentially agreed-to by the assignor of the present patent application and Microsoft Corporation of Redmond, Washington. The above-mentioned UCM specification is hereby incorporated by reference.

The circuit 72 can take the form of a programmable gate array, such as the erasable programmable logic device (EPLD) made by Altera. EPLDs are programmed by programmer machines made by a number of manufacturers, including Altera. These programmer machines operate by taking as inputs both the desired input signals to the circuit 72 and the desired resulting output signals, and then programming the EPLD appropriately. programmable gate array technology and the methods of programming programmable gate arrays is well-known to those skilled in the art. In other forms, the circuit 72 can take the form of an application-specific integrated circuit (ASIC) which is similarly designed with the aid of programmed electronic computers in accordance with techniques well-known to those skilled in the art.

The subchannels 74 and 76 typically take the form of wire cables having conventional 25-pin connectors to facilitate their connection to the first and second electronic devices 20 and 22. Also, where appropriate, one or both of the subchannels 74 and 76 can be connected to the circuit 72 by means of conventional 25-pin connectors. However, if desired, one of the subchannels 74 and 76, along with the circuit 72 can be built into one of the first and second electronic devices 20 and 22. For example, the subchannel 74 and the circuit 72 can be built into the first electronic device 20, with the connection between the I/O port 34 of the first electronic device 20 and the circuit 72 actually being housed within the first electronic device 20. Similarly, the second communication subchannel 76 and the circuit 72 can be built into the second electronic device 22. Further, if desired, either or both of the subchannels 74 and 76 can take forms other than wire cables, such as wireless channels implemented, for example, with infrared (IR) or radio frequency (RF) electromagnetic energy.

The subchannel 74 is connected between the I/O port 34 of the first electronic device 20 and the circuit 72 is connected between the I/O port 52 of the second electronic device 22 and the circuit 72. The subchannel 74 includes a plurality of bidirectional lines 78, a first plurality of unidirectional lines 80, and a second plurality of unidirectional lines 82. The bidirectional lines 78 facilitate bidirectional parallel communication of information between the I/O port 34 of the first electronic device 20 and the circuit 72. (Of course, the bidirectional lines 78 need not necessarily be used. Whether is it possible to use bidirectional lines depends on the character of the two devices.) The first plurality of unidirectional lines 80 facilitate unidirectional parallel communication of information from the I/O port 34 of the first electronic device 20 to the circuit 72, and the second plurality of unidirectional lines 82 facilitate unidirectional parallel communication of information to the I/O port 34 of the first electronic device 20 from the circuit 72. Lines 78, 80 and 82 are described similarly to the descriptions of lines 62, 64 and 66, respectively, in connection with FIG. 1.

The subchannel 76 includes a plurality of bidirectional lines 84, a first plurality of unidirectional lines 88, and a second plurality of unidirectional lines 86. The bidirectional lines 84 facilitate bidirectional parallel communication of information between the I/O port 52 of the second electronic device 22 and the circuit 72. The first plurality of unidirectional lines 88 facilitate unidirectional parallel communication of information from the I/O port 52 of the second electronic device 22 to the circuit 72, and the second plurality of unidirectional lines 86 facilitate unidirectional parallel communication of information to the I/O port 52 of the second electronic device 22 from the circuit 72. Lines 84, 86 and 88 are described similarly to the descriptions of lines 62, 64 and 66, respectively, in connection with FIG. 1.

When the channel 70 is established between the first electronic device 20 and the second electronic device 22, each of the devices 20 and 22 is possibly capable of identifying the type of channel 70. For example, if the channel 70 is a wire cable capable of supporting only 8-bit communications, the devices 20 and 22 can learn this from a special configuration of the 25-pin connector by which the cable is connected to the devices 20 and 22. In the preferred embodiment, for example, one of the pins that is connected to an outgoing signal line from one of the devices 20 and 22 can be wired to one of the pins that is connected to an incoming signal line of that same device 20 and 22. The pins that are actually connected in this way can be made unique to the type of cable of which they are a part, so that the device can immediately learn which type of cable they belong to by transmitting an appropriate signal on the appropriate outgoing line and waiting for a return on any of the possible incoming signal lines.

In the case of a 4-bit protocol, to transmit information from the first electronic device 20 to the second electronic device 22, the first electronic device 20 transmits a nibble of data to the second electronic device 20 through the first communication subchannel 74, the circuit 72, and then the second communication subchannel 76. The circuit 72 merely transmits the nibble without either reading it or transforming it. The nibble of data indicates the communication protocol capabilities of the first electronic device 20 and the length of the packet of information that the first electronic device 20 intends to send. In response to the receipt of each bit of the nibble transmitted by the first electronic device 20, the second electronic device 22 transmits a corresponding bit of a nibble which indicates the communication protocol capabilities of the second electronic device 22. The nibble transmitted by the second electronic device 22 is sent to the first electronic device through the channel 70, which neither reads nor changes the nibble.

In the case of an 8-bit protocol, to transmit information from the first electronic device 20 to the second electronic device 22, the first electronic device 20 transmits a byte of data to the second electronic device 20 through the first communication subchannel 74, the circuit 72, and then the second communication subchannel 76. The circuit 72 merely transmits the byte without either reading it or transforming it. The byte of data indicates the communication protocol capabilities of the first electronic device 20 and the length of the packet of information that the first electronic device 20 intends to send. In response to the receipt of each bit of the byte transmitted by the first electronic device 20, the second electronic device 22 transmits a corresponding bit of a byte which indicates the communication protocol capabilities of the second electronic device 22. The byte transmitted by the second electronic device 22 is sent to the first electronic device through the channel 70, which neither reads nor changes the byte.

By this means, both the first and second electronic devices 20 and 22 learn the communication protocol capabilities of the other device. Based on this information, the first and second electronic devices can establish the optimal communication mode which it should assume in order to maximize the performance (possibly, but not necessarily, measured in terms of data throughput alone) of the communications activities between the first and second communication devices 20 and 22. Typical possibilities for the modes are those compatible with a) 4-bit communications, b) standard 8-bit communications, c) 8-bit communications in accord with the extended capabilities port (ECP), and d) 8-bit communications compliant with the enhanced parallel port (EPP). These will be discussed subsequently.

Whatever the decision made by each of the first and second electronic devices 20 and 22 concerning an appropriate communication mode, this mode is transferred by the first and second electronic devices 20 and 22 each time a unit of information (i.e., a nibble, a byte or some other measure of packet content) is sent by the first electronic device 20 to the second electronic device 22. (Optionally, the mode need only be transferred before the transferral of a predetermined number of units of information.) When the first electronic device 20 is ready to transfer information to the second electronic device 22, it sends minimal units of information through the device 72 to the second electronic device 22. These minimal units of information contain a description of the transmission capabilities that the first electronic device 20 has available to transmit the subsequent packet of information.

In response to receipt of the capability-describing information from the first electronic device 20, the second electronic device 22 will send similar capability-describing information to the first electronic device 20 through the device 72. This information will contain a description of the capabilities which the second electronic device 22 has available to receive the information. The two electronic devices 20 and 22 then use table-lookup procedures to establish the modes of transfer. Both of these descriptions can also be intercepted by the circuit 72, or not. If the descriptions are intercepted, the circuit 72 will use conventional built-in logic circuitry to configure itself to transfer a subsequent packet of information from the first electronic device 20 to the second electronic device 22 in accord with the modes (or set of modes) described by each of the electronic devices 20 and 22. However, preferably, the first and second devices 20 and 22 transmit signals to the circuit 72 to cause the circuit 72 to be reconfigured.

If appropriate, the circuit 72 will also be configured to transfer another packet of information from the second electronic device 22 to the first electronic device 20, also in accord with the modes described by each of the electronic devices 20 and 22. For example, the second electronic device 22 can send a return packet back to the first electronic device 20 to confirm receipt of its intended packet. After the packet is received by the second electronic device 22 (and any resulting packets are received by the first electronic device 20), the device 72 reassumes the configuration it had before the first electronic device 20 initiated transmission of information to the second electronic device. Thereafter, if the first electronic device 20 attempts to send more information, the circuit 72 will again either have to be configured by the first and second devices 20 and 22, will have to configure itself to transmit the modes appropriately.

Of course, if desired, the transmission mode of either of the first and second electronic devices 20 and 22 can be chosen manually from the set of modes available for that device. Additionally, the circuit 72 can also be set manually depending upon the modes selected by the first and second devices 20 and 22.

FIG. 3 is a flow chart of the inventive method of configuring electronic devices for communication of information from one to the other. First, the first electronic device 20 (for example, a transmitter PC) prepares to send information to the second electronic device 22 (for example, a receiver PC); the circuit 72 is in its default configuration (step 100). Next, the first electronic device 20 transmits a byte or nibble containing a description of its mode, and/or alternatively, the length of the packet of information through the communication channel 70; the circuit 72 monitors the transmission of the byte or nibble (step 102). (Of course, the byte or nibble can describe sets of possible communication modes and/or contain check sums to qualify and validate the packet, and other protocol information.) The byte or nibble is then received through the circuit 72 by the second electronic device 22 (step 104). In response to receipt of the byte or nibble transmitted by the first electronic circuit 20, the second electronic circuit 22 transmits a byte or nibble containing a description of its mode through the communication channel 70; the circuit 72 monitors the transmission of the byte or nibble (step 106). (Alternatively, the circuit 72 does monitor the transmission of the byte or nibble.)

After the exchange of bytes or nibbles by the first and second electronic devices 20 and 22, and the monitoring of the exchange by the circuit 72, the first and second electronic devices 20 and 22 prepare to send information optimally and the circuit 72 reconfigures to optimal form for transmission of the information (step 108). (If the circuit 72 does not monitor the exchange of bytes or nibbles, the first and second electronic devices 20 and 22 transmit signals to reconfigure the circuit 72.) Next, the first electronic device 20 transmits its packet of information (step 110). After receipt of the transmitted packet of information, the second electronic device 22 optionally responds to the packet of information (step 112). After the transmission of the packet (and possible response) is complete, the circuit 72 reconfigures itself to its default configuration (step 114). The inventive method then returns to prepare to perform step 100.

Figure 4:
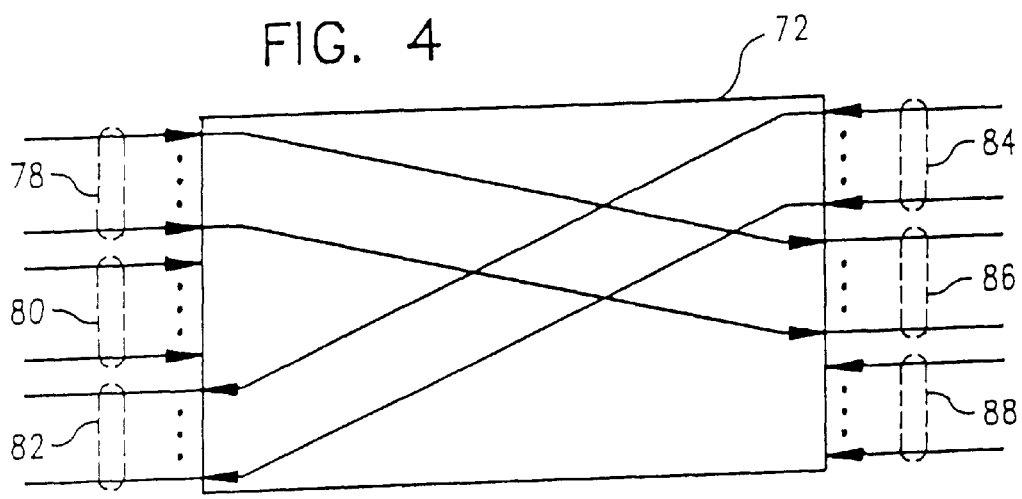
FIG. 4 is a schematic diagram of a first parallel interconnect scheme provided by the preferred embodiment of the invention when the mode for the receiver is a 4-bit mode.

FIG. 4 is a schematic diagram of a first parallel interconnect scheme provided by the preferred embodiment of the invention when the mode for the receiver is a 4-bit mode. In this situation, all communications take place in the form of 4-bit nibbles. The nibbles are generated by the first electronic device 20, which preprocesses the information from its byte-based form to nibbles. These nibbles are reconstructed to the form of 8-bit bytes after receipt. Accordingly, the logic of the circuit 72 is configured to prevent communication between the CONTROL lines of the I/O ports of the first and second electronic devices 20 and 22, respectively. The logic of the circuit 72 is also configured so that 4-bit nibbles plus 1 bit received over the bidirectional lines 78 from the first electronic device 20 are then transmitted over the unidirectional lines 86 from the circuit 72 to the second electronic device 22. Further, the logic of the circuit 72 is also configured so that 4-bit nibbles plus 1 bit received over the bidirectional lines 84 from the second electronic device 22 are then transmitted over the unidirectional lines 82 from the circuit 72 to the first electronic device 22.

Figure 5:
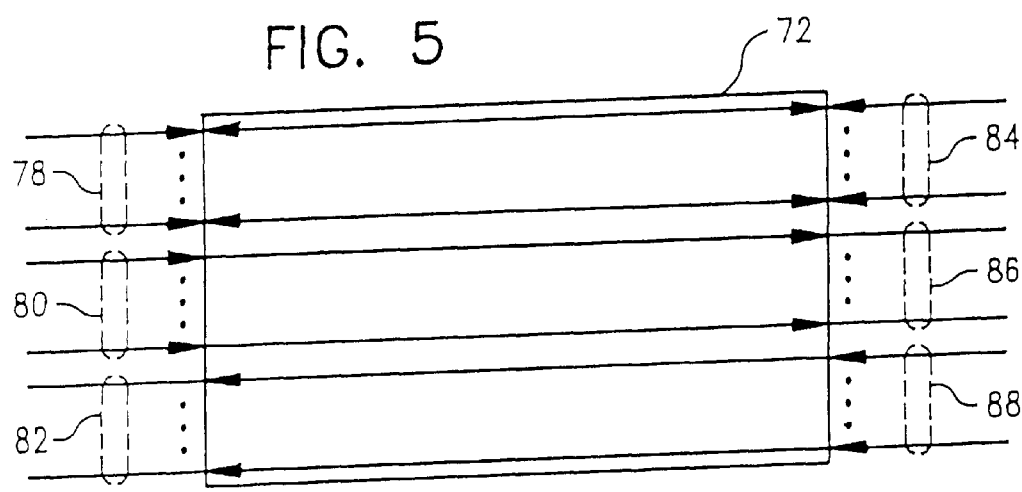
FIG. 5 is a schematic diagram of a second parallel interconnect scheme provided by the preferred embodiment of the invention.

FIG. 5 is a schematic diagram of a second parallel interconnect scheme provided by the preferred embodiment of the invention when the mode for the receiver is an 8-bit mode, but neither electronic device is an enhanced parallel port device. In this situation, all communications take place in the form of 8-bit bytes. Accordingly, the logic of the circuit 72 is configured to pass data information bidirectionally through the DATA lines 78 and 84 of the I/O ports of the first and second electronic devices 20 and 22, respectively. The logic of the circuit 72 is also configured so that parallel transmissions received from the first electronic circuit 20 over the lines 80 are passed straight through to the second electronic device 22 over the lines 86. Further, the logic of the circuit 72 is configured so that parallel transmissions received from the second electronic circuit 22 over the lines 88 are passed straight through to the first electronic device 20 over the lines 82.

Figure 6:
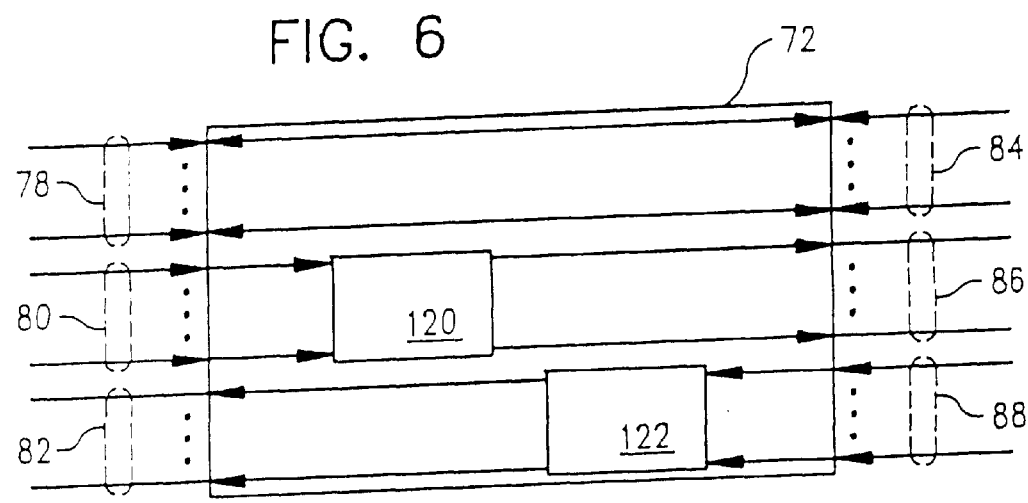
FIG. 6 is a schematic diagram of a third parallel interconnect scheme provided by the preferred embodiment of the invention.

FIG. 6 is a schematic diagram of a third parallel interconnect scheme provided by the preferred embodiment of the invention when the mode for the receiver is an 8-bit mode, where one or both electronic devices may be enhanced-type protocol (ECP or EPP) devices. In this situation, all communications take place in the form of 8-bit bytes. Accordingly, the logic of the circuit 72 is configured to pass data information bidirectionally through the DATA lines 78 and 84 of the I/O ports of the first and second electronic devices 20 and 22, respectively. The logic of the circuit 72 is also configured so that the information contained in the parallel transmissions received from the first electronic circuit 20 over the lines 80 is retransmitted to the second electronic device 22 over the lines 86, but only after it is reprocessed by the logic circuit 120. Further, the logic of the circuit 72 is configured so that the information contained in the parallel transmissions received from the second electronic circuit 20 over the lines 88 is retransmitted to the first electronic device 20 over the lines. 82, but only after it is reprocessed by the logic circuit 122.

Figure 7:
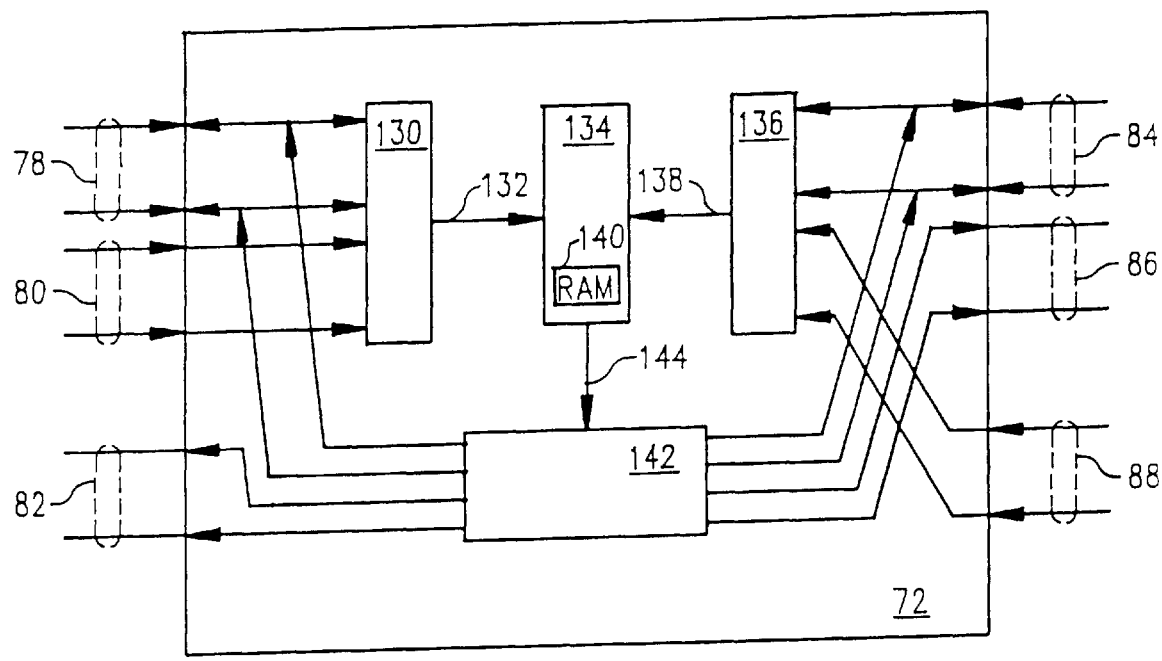
FIG. 7 is a schematic diagram of a fourth parallel interconnect scheme pro vided by the preferred embodiment of the invention.

FIG. 7 is a schematic diagram of a fourth parallel interconnect scheme provided by the preferred embodiment of the invention to handle the general situation of connecting two devices with a parallel port which will work regardless of protocol. In this situation, some of the communications from one of the electronic devices must be processed logically to place it in the form expected by the other electronic device. Accordingly, information received by the electronic circuit 72 from the first electronic device 20 over the lines 78 and 80 is processed by a first subcircuit 130 and then transmitted over the line 132 to a logic circuit 134. In an alternative embodiment of the circuit 72, the logic circuit 134 contains a RAM 140 (or other device capable of storing at least three bytes) for storage of the logically-processed information. Similarly, information received by the electronic circuit 72 from the second electronic device 22 over the lines 84 and 88 is processed by a second subcircuit 136 and then transmitted over the line 138 to the logic circuit 134. The information logically processed by the logic circuit 134 is then transmitted to the third subcircuit 142 over the line 144. Subsequently the information processed by the third subcircuit 142 is then transmitted from the circuit 72.

In one particularly important configuration, where the logic circuit 134 contains a RAM 140, the information received by the circuit 72 from the first electronic device 20 can be stored in the RAM 140 and then subsequently retrieved from the RAM 140 and logically processed by the third logic circuit 142. It may then be retransmitted to the second electronic device 22 over the lines 84 and 86. A response to the information transmitted to the second electronic device 22 may be received by the circuit 72 over the lines 88, processed by the second subcircuit 136, stored in the RAM 140 as part of the logic circuit 134, retrieved subsequently for further processing by the third subcircuit 142 and then transmitted to the first electronic circuit 20 over the lines 82.

As one particular example of the utility of the circuit 72 shown in FIG. 7, the circuit 72 can be used to store the received information in the RAM 140, parsed by the third subcircuit 142, and then passed on to the second electronic device 22.

The foregoing detailed description of the preferred embodiment of the invention has been expressed in terms of one PC communicating with another PC. However, it will be well understood by those skilled in the art that the invention is equally applicable to a PC communicating with another electronic device, such as a printer. Likewise, the second electronic device can be an interface circuit to a network, such as a local area network (LAN). In addition, there are many alternative embodiments of the invention that would occur to those skilled in the art and which are within the scope of the present invention. Accordingly, the present invention is to be limited only by the following claims.

What is claimed is:

1. An apparatus for transferring information from a first electronic device to a second electronic device, wherein the first electronic device communicates through a first I/O port according to a first protocol and the second electronic device communicates through a second I/O port according to a second protocol, the apparatus comprising:

a circuit adapted to be connected between the first and second I/O ports, the circuit being adapted to receive signals from the first and second electronic devices through the first and second I/O ports, respectively, and being configurable in response to the signals so that the circuit receives the information according to the first protocol through the first I/O port and transmits the information to the second electronic device through the second I/O port according to the second protocol, wherein the two I/O ports each include means to transmit data information through DATA lines and means to receive status information through STATUS lines, the first protocol defining the form of the data and status information to be transmitted through the DATA lines and received through the STATUS lines, respectively, of the first I/O port and the second protocol defining the form of the data and status information to be transmitted through the DATA lines and received through the STATUS lines, respectively, of the second I/O port, the circuit including first and second subcircuits, the first subcircuit to translate the data information received from the first electronic device through the DATA lines of the first I/O port according to the first protocol and then to transmit the data information through the STATUS lines of the second I/O port according to the second protocol, and the second subcircuit to translate the status information received from the second electronic device through the STATUS lines of the second I/O port according to the second protocol and then to transmit the status information according to the first protocol through the STATUS lines of the first I/O port.

2. An apparatus for transferring information from a first electronic device to a second electronic device, wherein the first electronic device communicates through a first I/O port according to a first protocol and the second electronic device communicates through a second I/O port according to a second protocol, the apparatus comprising:

a circuit adapted to be connected between the first and second I/O ports, the circuit being adapted to receive signals from the first and second electronic devices through the first and second I/O ports, respectively, and being configurable in response to the signals so that the circuit receives the information according to the first protocol through the first I/O port and transmits the information to the second electronic device through the second I/O port according to the second protocol, wherein the two I/O ports each include means to transmit data information through DATA lines, means to transmit control information through CONTROL lines and means to receive status information through STATUS lines, the first protocol defining the form of the data, control and status information to be transmitted through the DATA and CONTROL lines and received through the STATUS lines, respectively, of the first I/O port and the second protocol defining the form of the data, control and status information to be transmitted through the DATA and CONTROL lines and received through the STATUS lines, respectively, of the second I/O port, the circuit including first and second subcircuits, the first subcircuit to translate the control information received from the first electronic device through the first I/O port according to the first protocol to information in a form according to the second protocol and then to transmit the control information according to the second protocol through the STATUS lines of the second I/O port, and the second subcircuit to translate the status information received from the second electronic device through the CONTROL lines of the second I/O port according to the second protocol to information in a form according to the first protocol and then to transmit the status information according to the first protocol through the STATUS lines of the first I/O port.

3. The apparatus of claim 2 wherein the first subcircuit further processes the control information received from the first electronic device through the STATUS lines of the first I/O port according to the first protocol in response to the status information received from the second electronic device through the STATUS lines of the second I/O port according to the second protocol and the second subcircuit further processes the control information received from the second electronic device through the CONTROL lines of the second I/O port according to the second protocol in response to the status information received from the first electronic device through the CONTROL lines of the first I/O port according to the first protocol.

* * * * *